United States Patent [19]

Rokutan et al.

[11] Patent Number: 5,583,836

[45] Date of Patent: *Dec. 10, 1996

[54] OPTICAL RECORDING/REPRODUCING APPARATUS CAPABLE OF MULTI-TRACK ACCESS FOR SIMULTANEOUS MULTITRACK RECORDING/REPRODUCTION

[75] Inventors: Takao Rokutan; Mitsuo Oshiba; Takefumi Sakurada; Naoaki Tani; Takumi Sugaya, all of Tokyo, Japan

[73] Assignee: Olympus Optical Co., Ltd., Tokyo, Japan

[*] Notice: The portion of the term of this patent subsequent to Aug. 9, 2013, has been disclaimed.

[21] Appl. No.: 103,967

[22] Filed: Aug. 9, 1993

[30] Foreign Application Priority Data

Aug. 31, 1992 [JP] Japan ................................ 4-231047

[51] Int. Cl.$^6$ ........................................... G11B 7/00
[52] U.S. Cl. ...................... 369/44.28; 369/32; 369/44.37
[58] Field of Search ............................ 369/44.37, 44.38, 369/32, 112, 44.28, 44.27, 44.26, 54, 58; 360/78.04, 78.08, 78.14

[56] References Cited

U.S. PATENT DOCUMENTS

| | | | |
|---|---|---|---|
| 4,283,777 | 8/1981 | Curry et al. | 369/32 |
| 4,598,393 | 7/1986 | Pierce et al. | 369/44.38 |
| 4,720,825 | 1/1988 | Kokado | 369/44.37 |
| 4,730,293 | 3/1988 | Pierce et al. | 369/44.38 |
| 4,787,075 | 11/1988 | Matsuoka et al. | 369/44.38 |
| 4,896,025 | 1/1990 | Hasegawa . | |
| 4,931,628 | 6/1990 | Wada . | |
| 4,982,391 | 1/1991 | Sakagami et al. . | |
| 5,008,521 | 4/1991 | Ohki et al. . | |
| 5,191,572 | 3/1993 | Tsutsui et al. | 369/44.38 |
| 5,195,081 | 3/1993 | Usui | 369/112 |
| 5,237,556 | 8/1993 | Pierce | 369/44.42 |
| 5,247,504 | 9/1993 | Akatsuka | 369/44.38 |
| 5,267,226 | 11/1993 | Matsuoka et al. | 369/44.37 |
| 5,274,615 | 12/1993 | Rokutan | 369/44.32 |
| 5,293,568 | 3/1994 | Oshiba et al. . | |

FOREIGN PATENT DOCUMENTS

| | | | |
|---|---|---|---|
| 63-37876 | 2/1988 | Japan . | |
| 63-094438 | 4/1988 | Japan | 369/44.38 |
| 02227835 | 9/1990 | Japan | 369/44.37 |

*Primary Examiner*—Georgia Y. Epps
*Assistant Examiner*—P. W. Huber
*Attorney, Agent, or Firm*—Frishauf, Holtz, Goodman, Langer & Chick

[57] ABSTRACT

In an optical card recording/reproducing apparatus having a multi-track read type optical head in which a reproducing light beam is radiated on a plurality of tracks on an optical card having a large number of tracks parallel to each other so as to cause a plurality of reproducing light-receiving elements to simultaneously reproduce data of the plurality of tracks on which the reproducing light beam is radiated, the light beam is moved such that the maximum or minimum address of addresses of the tracks irradiated by the light beam is located at the target track. After one multi-track reproduction is performed, the light beam is moved by the distance corresponding to the number of multi-tracks.

8 Claims, 11 Drawing Sheets

(PRIOR ART)

FIG. 1

(PRIOR ART)

OPTICAL RECORDING/REPRODUCING APPARATUS CAPABLE OF MULTI-TRACK ACCESS FOR SIMULTANEOUS MULTITRACK RECORDING/REPRODUCTION

BACKGROUND OF THE INVENTION

1. Field of the Invention

The present invention relates to an optical recording/reproducing apparatus for recording/reproducing data using an optical recording medium such as an optical card.

2. Description of the Related Art

In recent years, a technique of data processing has been developed, and media for recording a large amount of data have been required. As one of the media, an optical recording medium has received a great deal of attention. An optical card is known as one of the optical recording media. As an apparatus for recording data onto the optical card and reproducing data of the optical card, an optical card recording/reproducing apparatus is practically used.

In the optical card, a laser beam is radiated through a lens on a data recording layer having a high reflectance and arranged on a substrate having the same shape as that of a credit card to form pits (holes) having a low reflectance on the recording layer by a thermally irreversible change, thereby writing data on the recording layer. The optical card has a recording capacity several or ten thousand times that of a conventionally used magnetic card. Although data cannot be rewritten in the optical card as in an optical disk, the recording capacity of the optical card is very large, i.e., 1 to 2 MG. Therefore, optical cards can be used in a variety of applications such as bankbooks, portable maps, prepaid cards used in shopping or the like. In addition, since the optical card has the characteristic feature of inhibiting data rewrite, the optical card can be used in applications such as individual health management cards which does not allow illegal data updating.

Figure 1:
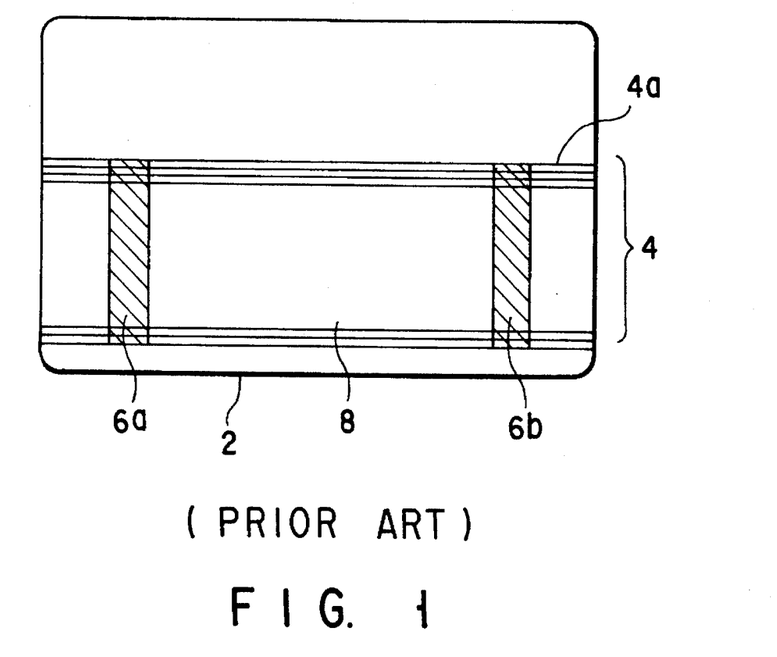
FIG. 1 is a view showing a conventional optical card.

FIG. 1 is a plan view showing an optical card. An optical data recording portion 4 having a plurality of parallel tracks 4a is formed on an optical card 2 in a lateral direction. Data is recorded on the tracks 4a by forming data pits and data is reproduced from the tracks 4a by reading the data pits. Forming/reading data pits is performed by scanning a light beam emitted from an optical head in a direction along the tracks 4a. Scanning is usually performed by reciprocally moving the card 2 in a direction along the tracks 4a. Therefore, the data pits may be read in a direction reverse to the direction in which the data pits are formed. In order to correctly read the data, reproduced data is temporarily written in a buffer memory, and a data string is inverted in a direction of the time axis in accordance with the reproduction direction.

ID portions 6a and 6b in which identification data such as track addresses are recorded are formed on both ends of the data recording portion 4. Although the tracks 4a are formed to extend over the entire length of the optical card 2, the end portions of the tracks are easily damaged or contaminated and have poor reliability. Further, in order to sufficiently stabilize a relative moving speed between the optical card and the optical head in the track directions, the ID portions 6a and 6b are formed at positions inward from the ends of the card at predetermined distances (e.g., 4 mm). A data recording portion 8 is defined between the ID portions 6a and 6b. Since data are read from both the directions of the optical card while the optical card is reciprocally conveyed, the ID portions 6a and 6b are formed so that track addresses can be read from both directions. Therefore, in FIG. 1, when a light beam is moved from the left to the right along the tracks, the left ID portion 6a is read; when a light beam is moved from the right to the left, the right ID portion 6b is read, thereby identifying a tracking address. Thus, the ID data such as the tracking address can be read out regardless of a scanning direction before data is read out.

Figure 3:
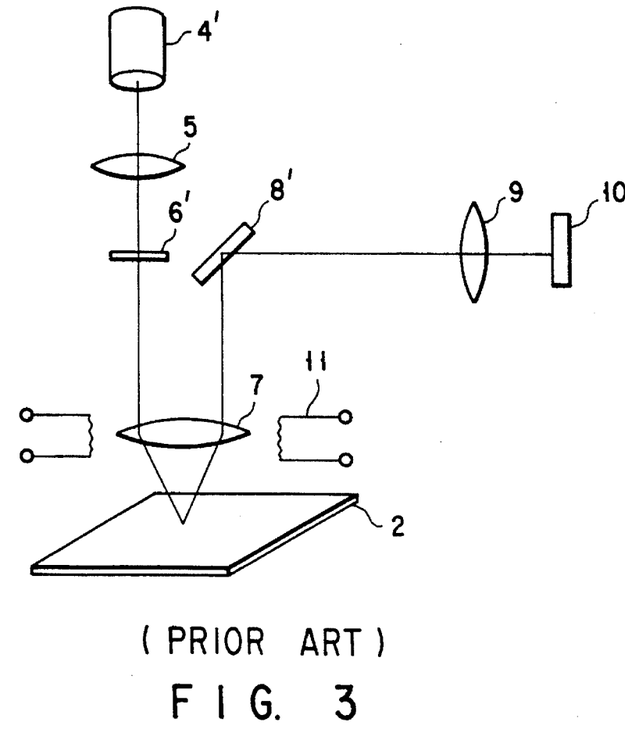
FIG. 3 is a schematic view showing the arrangement of an optical system of a conventional optical reproducing head.

An optical system of the optical head for reproducing data of the optical card is shown in FIG. 3. A laser beam emitted from a light-emitting element 4' such as a laser diode is collimated into a parallel beam by a collimator lens 5, diffracted by a diffraction grating 6', and focused on the optical card 2 through an objective lens 7. The focused light is reflected by the optical card 2, and is incident on a detector 10 through a mirror 8' and a detection system lens 9.

Figure 2:
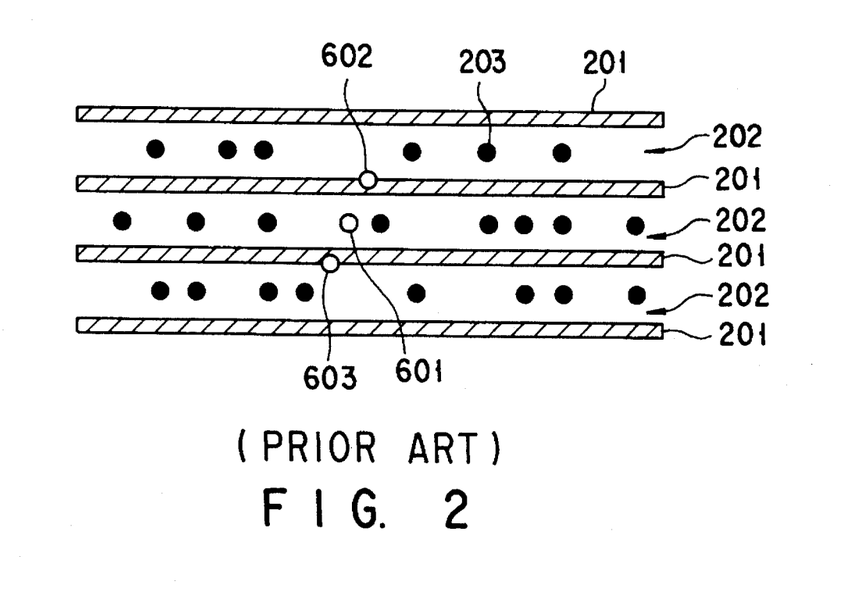
FIG. 2 is a view for explaining a data recording portion of the conventional optical card.

The focused light beam on the optical card 2, as shown in FIG. 2, is constituted by a 0th-order diffracted beam 601 called a main beam and two 1st-order diffracted beams 602 and 603 called sub-beams, all of which are diffracted by the diffraction grating 6'. The main beam 601 is used to reproduce the data pits 203 or to generate a focus error signal for focusing control, and each of the sub-beams 602 and 603 is radiated half on a corresponding one of the track guides 201 and is used to generate a tracking error signal.

Figure 4:
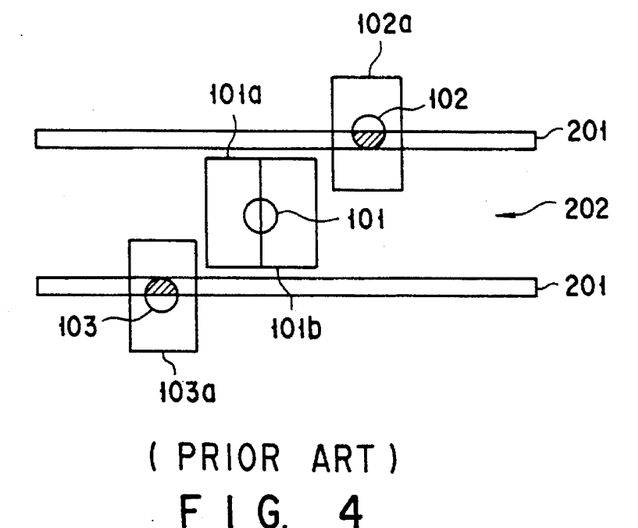
FIG. 4 is a view showing an optical image projected on a photodetector of the conventional optical reproducing head.

The light beam reflected by the optical card 2 and incident on the detector 10, as shown in FIG. 4, is constituted by three beams. Light beams 101, 102, and 103 shown in FIG. 4 correspond to light beams 601, 602, and 603 shown in FIG. 2, respectively. In the detector 10, an optical system is constituted such that the light beam 101 is radiated on the dividing line of detection regions 101a and 101b obtained by dividing a square detection region, the light beam 102 is radiated on the center of a detection region 102a, and the light beam 103 is radiated on the center of a detection region 106a.

In addition, the optical system is constituted such that the light beam 101 is moved in the direction perpendicular to the dividing line of the detection regions 101a and 101b when the beam on the optical card is defocused. Therefore, when a difference between amounts of light incident on the detection regions 101a and 101b is calculated, a focus error signal representing an error of the in-focus position can be obtained. When the objective lens 7 is driven by a driving means 11 according to the focus error signal to be brought close to or separated from the card 1, focusing control is performed such that the light beam is kept in an in-focus state on the card.

When the beams 602 and 603 shown in FIG. 2 are moved in the direction perpendicular to the tracks 202, the overlapping areas of the beams 602 and 603 on the track guides 201 are changed. Therefore, tracking error signals representing errors of the beams 602 and 603 from the centers of the track guides 201 can be obtained by calculating an output difference between the detection regions 102a and 106a. The objective lens 7 is moved by the driving means 11 in the direction perpendicular to the track guides 201 according to the tracking error signal, so that tracking control is performed to keep the beam 601 at the center of each of the tracks 202.

Figure 5:
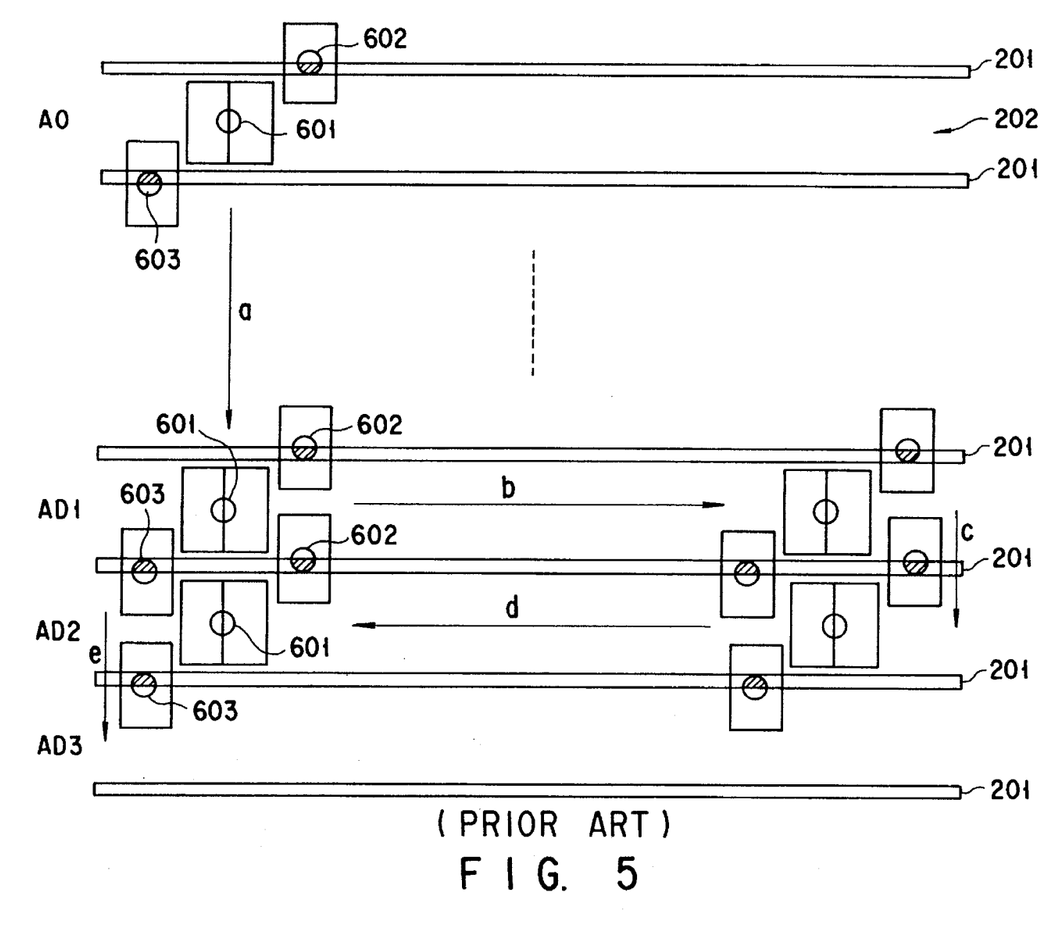
FIG. 5 is a view for explaining track access in the conventional optical card recording/reproducing apparatus.

FIG. 5 is a view for explaining an access method of an arbitrary track, which method is employed in the optical data recording/reproducing apparatus arranged as described above.

In FIG. 5, as in FIGS. 2 and 4, reference numerals 201 denote track guides for guiding the light beam in the track directions; 202, tracks formed between the track guides 201; 601, a main beam for reproducing data pits formed along the tracks 202 and for generating focus error signals; and 602 and 603, sub-beams, each formed to half overlap a corresponding one of the track guides 201, for generating tracking error signals. In FIG. 5, both the ends of the tracks 202 represent both the ends of the card, arrows a, b, c, and d indicate the moving direction of the beam on the card. In general, the beam is moved on the card in a direction a or c perpendicular to the tracks by moving an optical head itself or an objective lens, and the beams on the card are moved in a direction b or d parallel to the tracks by moving the card with respect to the optical head.

Data reproduction of a given track is designated by an external apparatus (not shown) such as a host computer. This given track designated by a reproduction request is referred to as a target track address. In the example of FIG. 5, the target address is represented by AD1. A light beam is moved in the direction of an arrow a by a difference between a track address A0 at which the main beam 601 is currently located and the target track address AD1. Data of the target track AD1 is read by scanning the light beam (by moving the optical card) in the track direction of an arrow b. When the light beam reaches the right end of the track AD1, the light beam is moved in the direction of an arrow c by one track. Data of the next track AD2 is read by scanning the light beam (by moving the optical card) in the track direction of an arrow d. When the light beam reaches the left end of the track AD2, the light beam is moved in the direction of an arrow e by one track. Data of the subsequent tracks are read by scanning the light beam in the same manner as above. The above scanning is sequentially repeated until the number of read tracks reaches N.

According to the above data read operation, a total of N track scannings must be respectively performed so that a long time is required for a reproduction operation, and the reproduction operation cannot be performed at very high speed.

The drawback of the above access method is also applicable to the recording operation.

SUMMARY OF THE INVENTION

The present invention has been made in consideration of the above circumstances, and has as its object to provide an optical data recording/reproducing apparatus capable of quickly accessing a target track, shortening a processing time for data reproduction, and increasing a reproduction speed.

According to the present invention, there is provided an apparatus for recording/reproducing data using an optical data recording medium having a large number of data recording tracks, the apparatus comprising:

means for generating a recording/reproducing light beam which simultaneously irradiates a plurality of tracks;

means for simultaneously accessing the plurality of tracks by scanning the light beam along the tracks; and means for shifting the light beam in a direction perpendicular to the tracks.

According to another aspect of the present invention, there is provided an apparatus for recording/reproducing data using an optical data recording medium having a large number of data recording tracks, the apparatus comprising:

means for generating a recording/reproducing light beam which simultaneously irradiates a plurality of tracks;

means for detecting addresses of the tracks which are recorded on an end of the tracks;

first moving means for moving the light beam in a direction perpendicular to the tracks by a distance corresponding to a distance difference between the detected addresses and an address of the track to be accessed; and means for simultaneously accessing the plurality of tracks by simultaneously scanning the light beam along the plurality of tracks.

According to the present invention, a plurality of tracks can be simultaneously accessed. Therefore, a processing time for data recording/reproduction can be shortened, and a recording/reproduction speed can be increased.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of an optical data recording/reproducing apparatus according to the present invention will now be described with reference to the accompanying drawings.

Figure 6:
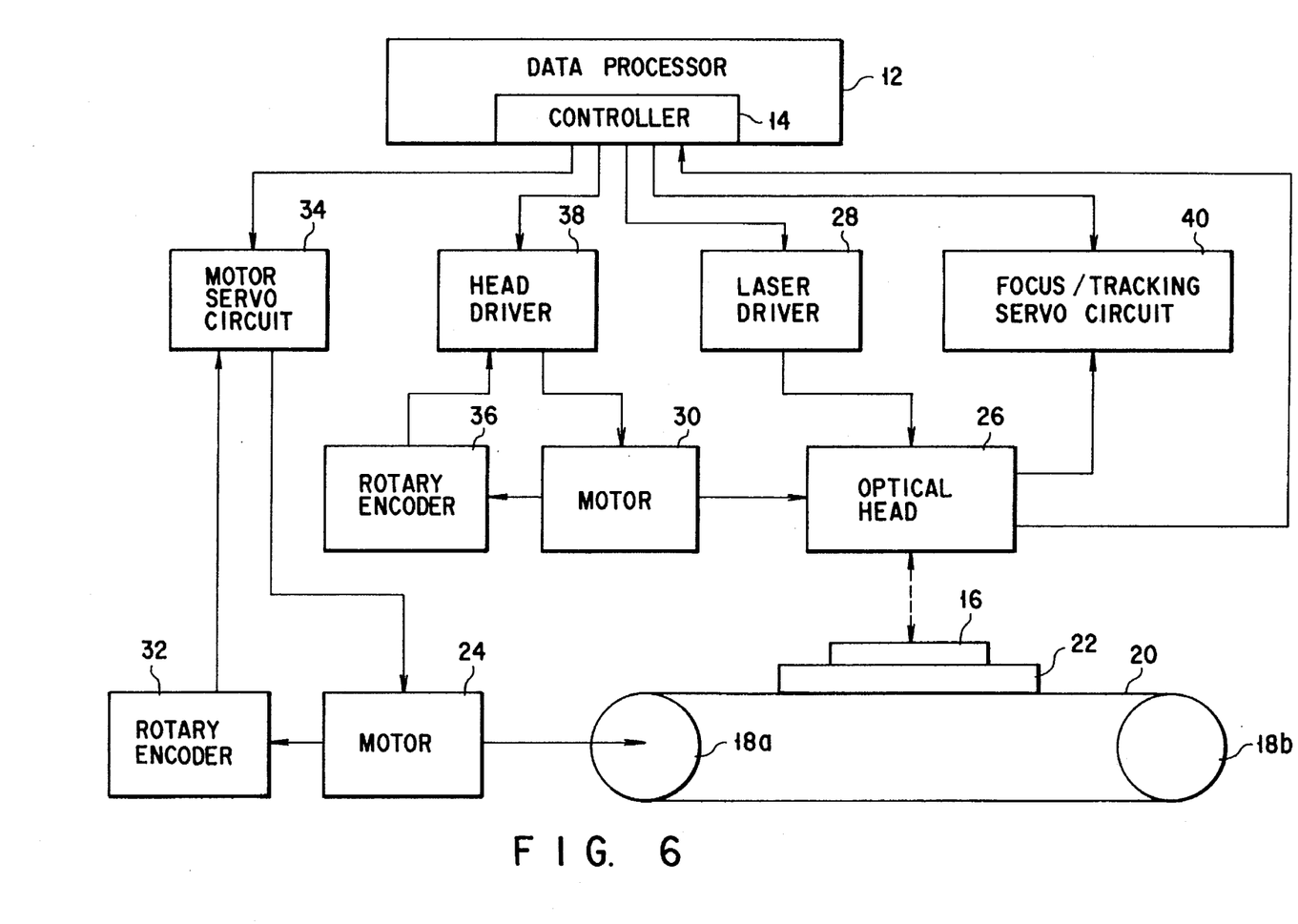
FIG. 6 is a block diagram of an optical data recording/reproducing apparatus according to a first embodiment of the present invention.

FIG. 6 is a block diagram schematically showing the structure of an apparatus for optically recording/reproducing data using an optical card. A data processor 12 manages the various types of required control operations of the whole system and has a controller 14 for controlling each of the elements that are to be controlled. The data processor 12 performs data write and processes readout data. Write data and the readout data may be exchanged with an external host system, or the data processor 12 itself may have an input/output means.

When an optical card 16 is inserted in the apparatus main body through an insertion port formed in a housing (not shown), the optical card 16 is loaded on a conveyor table 22 provided at a predetermined position on a conveyor belt 20 applied between a pair of pulleys 18a and 18b that are arranged a predetermined distance apart.

The optical card 16 has the same structure as that shown in FIG. 1 and has a data recording portion 4 in which a plurality of tracks 4a are arranged. ID portions 6a and 6b are arranged in the vicinities of the two ends of each track 4a. A data portion 8 is arranged in the area sandwiched between the ID portions 6a and 6b.

A motor 24 is connected to the pulley 18a. When the motor 24 is controlled to rotate in the clockwise/counterclockwise direction, the pulley 18a is rotated in the clockwise/counterclockwise direction. When the pulley 18a is rotated in the clockwise/counterclockwise direction, the conveyor belt 20 is moved in the forward/reverse direction, thereby reciprocally moving the conveyor table 22. Then, the optical card 16 loaded on the conveyor table 22 can be repeatedly moved in the direction of tracks.

The apparatus main body has an optical head 26 for recording or reading data by radiating a light beam on the tracks of the optical card 16. The optical head 26 is connected to a laser driver 28. The laser driver 28 drives a semiconductor laser provided in the optical head 26 for generating the light beam, and is connected to the controller 14. The controller 14 controls to drive the semiconductor laser, thereby controlling radiation of the light beam emitted from the optical head 26 onto the optical card 16. The optical head 26 is arranged at a position above, e.g., the central position of an area (between the pulleys 18a and 18b) where the conveyor belt 20 is disposed. The optical head 26 is connected to a motor 30. When the motor 30 is driven, the optical head 26 can be moved in a direction perpendicular to the moving direction of the conveyor belt 20, i.e., in a direction across the tracks of the optical card 16 loaded on the conveyor table 22.

With this structure, when the motor 24 is driven, the optical card 16 is reciprocally conveyed in the direction of tracks, and when the motor 30 is driven, the optical head 26 is reciprocally moved in a direction perpendicular to the tracks. Hence, when the optical head 26 and the optical card 16 are moved relative to each other, each track of the optical card 16 can be scanned by the optical head 26.

The motor 24 is connected to a rotary encoder 32 for detecting the position of the conveyor table 22 with respect to the optical head 26. The rotary encoder 32 generates a pulse at every predetermined rotational angle. One pulse of the rotary encoder 32 corresponds to, e.g., the relative moving amount of 50 μm of the conveyor table 22 with respect to the optical head 26.

The motor 24 is controlled by a motor servo circuit 34. The motor servo circuit 34 is connected to the rotary encoder 32 and the controller 14. The motor servo circuit 34 detects the convey speed of the optical card 16 based on the positional data sent from the rotary encoder 32 and controls the rotational speed of the motor 24. In this case, a control command is sent from the controller 14 to the motor servo circuit 34 so that the convey speed becomes a constant speed in the range from the ID portions 6a to 6b, in FIG. 1, of the optical card 16, and the rotational speed of the motor 24 is controlled based on the convey speed of the optical card 16.

The motor 30 connected to the optical head 26 is connected to a rotary encoder 36 for detecting the position of the optical head 26 with respect to (the tracks of) the optical card 16 in a manner similar to that of the motor 24. The motor 30 and the rotary encoder 36 are connected to an optical head driver 38, and the motor 30 is controlled by the optical head driver 38. The optical head driver 38 is connected to the controller 14. A control command is sent from the controller 14 to the optical head driver 38 based on the positional data and the like sent from the rotary encoder 36, thereby controlling the motor 30.

A focus/tracking servo circuit 40 is provided in the apparatus and connected to the optical head 26 and the controller 14. The focus/tracking servo circuit 40 drives the optical head 26 in the focusing direction and a direction perpendicular to the tracks based on a focus error signal and a tracking error signal generated by the light beam reflected by the optical card 16. Then, the incident light always traces the target track of the optical card 16 in the in-focus state.

Figure 7:
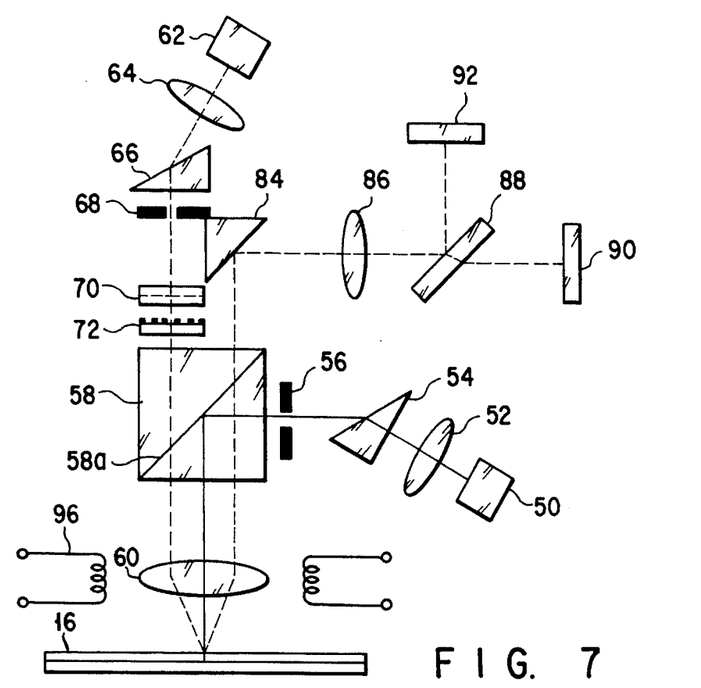
FIG. 7 is a view showing the structure of an optical head of the first embodiment.
Figure 8:
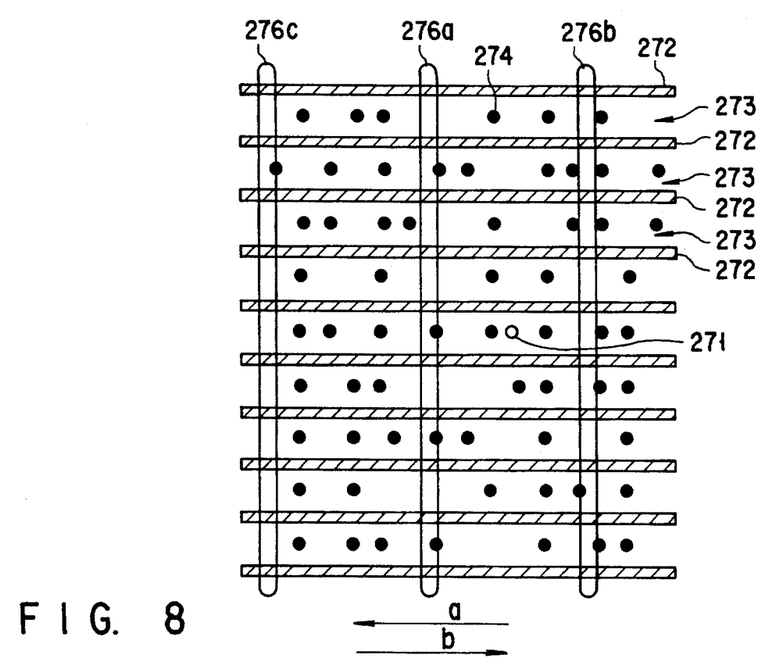
FIG. 8 is a view showing the positional relationship, on the optical card, between recording light beam spot and spots formed by the diffracted light of a reproducing light beam formed on the optical card.
Figure 9:
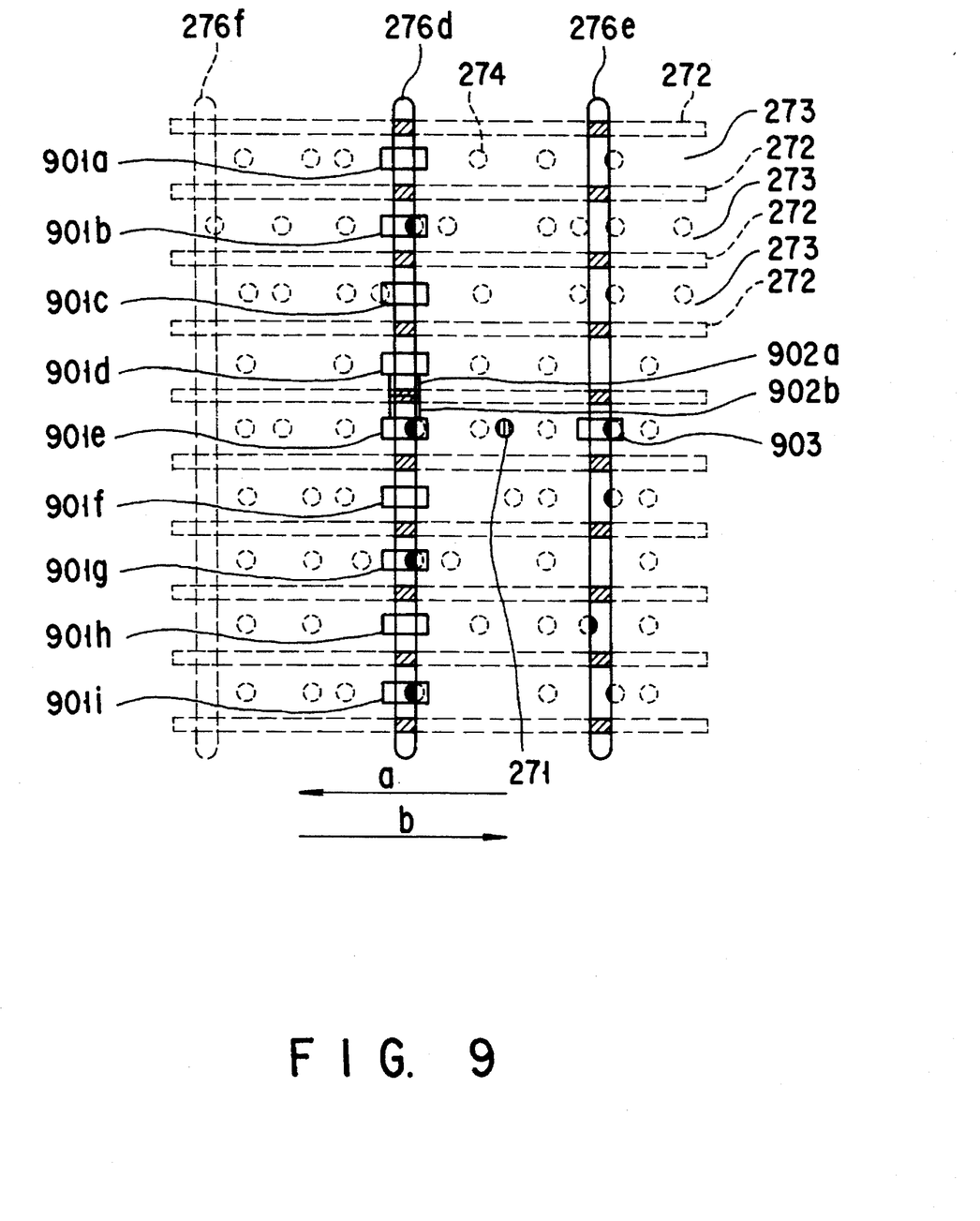
FIG. 9 is a view showing the positional relationship between the spot images of the recording light beam and spot images formed by the diffracted light of the reproducing light beam projected on a photodetector.

A structure of the optical head 26 used by the optical card data reproducing apparatus described above, the positional relationship between the recording and reproducing light beam spots formed on the optical card 16 by the optical head 26, and the spot images of the recording and reproducing light beams projected on the photodetector array in the optical head 26 will be described with reference to FIGS. 7 to 9. FIG. 7 is a view showing a structure of the optical head 26 provided in the optical card data reproducing apparatus. FIG. 8 is a view showing the positional relationship between the recording and reproducing light beam spots formed on the optical card 16. FIG. 9 is a view showing the spot images of the recording and reproducing light beams projected on the photodetector in the optical head 26.

As shown in FIG. 7, a semiconductor laser 50 serving as a data recording light source is provided to the optical head 26. The semiconductor laser 50 generates a laser beam upon reception of a drive signal from the laser driver 28 that operates under the control of the controller 14. The light beam generated by the semiconductor laser 50 is collimated to a parallel beam having a substantially elliptic section by a collimator lens 52. The parallel beam is shaped by a shaping prism 54 to have a substantially circular section as only the short-axis component of the ellipse is enlarged. Thereafter, the diameter of the parallel beam is reduced by a circular stop 56 (apertured member) such that the spot of the parallel beam has a predetermined size on the recording medium (the optical card 16). Then, the parallel beam is incident on a polarization beam splitter 58.

Since the recording light beam mostly consists of S-polarized light components due to the nature of the semiconductor laser 50, most components of the beam are reflected by a reflecting surface 58a of the polarization beam splitter 58 and incident on the optical axis of an objective lens 60. This light beam is focused by the objective lens 60 to form a circular spot on the optical card 16. Then, the energy density of the optical card 16 is locally increased to cause a thermally irreversible change in recording layer (data portion 8) of the optical card 16, thereby forming a recording pit.

The objective lens 60 is driven by an objective lens driving means 96 so as to be brought close to or separated from the card on the basis of a focus error signal, and focusing control is performed such that the light beam is kept in an in-focus state on the card 16. The objective lens 60 is driven by the objective lens driving means 96 in the direction perpendicular to the tracks on the basis of a tracking error signal, and tracking control is performed such that the light beam is kept at center of the track.

A semiconductor laser 62 is provided as the data reproducing light source independently of the semiconductor laser 50. A light beam generated by the semiconductor laser 62 passes through a collimator lens 64 to be collimated to a parallel beam having a substantially elliptic section. Then, this parallel beam is shaped by a shaping prism 66 to have a substantially circular section as only the short-axis component of the ellipse is enlarged. Thereafter, the diameter of this parallel beam having the circular section is further reduced by a circular stop 68 (apertured member) such that the spot of the parallel beam has a predetermined size on the recording medium. Then, the parallel beam is incident on a plano-concave cylindrical lens 70.

This reproducing light beam is refracted only in a plane perpendicular to the optical axis by the plano-concave cylindrical lens 70 so that the light beam slightly diverges in this direction. Furthermore, the light beam is divided into a 0th-order diffracted beam and two first-order diffracted beams by a diffraction grating 72. At this time, assume that the plano-concave cylindrical lens 70 and the diffraction grating 72 are disposed at such positions that the diverging direction of the light beam diverged by the plano-concave cylindrical lens 70 and the diffracting direction of the light beam diffracted by the diffraction grating 72 are substantially orthogonal.

Since the three light beams divided by the diffraction grating 72 mostly consist of p-polarized components due to the nature of the semiconductor laser 62, most components of the beams pass through the polarization beam splitter 58 and are incident on the objective lens 60. These light beams are focused by the objective lens 60 to form three spots as images on the optical card 16. Since the light beam is diverged in one direction by the plano-concave cylindrical lens 70, the respective light beam spots are enlarged in the diverging direction to form elliptic spots on the optical card 16.

FIG. 8 shows the positional relationship between the recording and reproducing light beam spots formed on the optical card 16.

A recording light beam spot 274 is formed to be located either between a spot 276a formed by the 0th-order diffracted light of the reproducing light beam and a spot 276b formed by the first-order diffracted light of the reproducing light beam, or between the spot 276a and a spot 276c formed by the first-order diffracted light of the reproducing light beam. The layout of the respective spots is adjusted by imparting a relative angular difference between the optical axis of the recording light beam and that of the reproducing light beam before being incident on the objective lens 60 when the optical head is assembled and adjusted. The cylindrical lens 70 is disposed such that the enlarging direction of the reproducing light beam spots 276a, 276b, and 276c on the optical card 16 is substantially perpendicular to the extending direction of the tracks. Therefore, each of the elliptic reproducing light beam spots 276a, 276b, and 276c is distributed across the plurality of tracks, and data of the plurality of tracks can be simultaneously reproduced.

The spots 276a, 276b, and 276c formed by the diffracted light of the reproducing light beam are regularly reflected by the optical card 16 as their amounts of light are modulated by track guides 272 and the presence/absence of a data pit 274 on the optical card 16. Each track guide 272 is provided between adjacent tracks 273. The tracks 273 are areas having a high reflectance, while the track guides 272 and the pits 274 are areas having a low reflectance. These reflected light beams pass through the objective lens 60 and are guided to the polarization beam splitter 58 as substantially parallel light. Since the reflected light is regularly reflected by the optical card 16, it substantially has the P-polarized components, and most components are guided to a reflecting mirror 84 through the polarization beam splitter 58. Then, after the reflected light is reflected by the reflecting mirror 84, it is focused by a condenser lens 86 and split by a half mirror 88. The split light components are incident on either the light-receiving surface of a signal reproducing/tracking photodetector 90 and the light-receiving surface of a focusing photodetector 92 to enlarge and project the spot images.

At this time, since the reproducing light beam is incident on a position of the objective lens 60 which is offset from the optical axis, so-called off-axis focus detection is performed. The focusing photodetector 92 has, e.g., two-divided photodetectors for detecting the movement of the image of the reproducing light beam spot caused by a focusing error. Then, a focusing error signal corresponding to the focusing error is generated.

FIG. 9 shows the spot image of the recording light beam and the spot images of the diffracted reproducing light beams that are projected on the signal reproducing/tracking photodetector 90.

Signal reproducing photodetector elements 910a to 901i and tracking photodetector elements 920a and 902b are arranged on the photodetector 90. In addition, a signal reproducing photodetector element 903 is provided to the photodetector 90 at a position where an image 276e corresponding to the spot 276b of the first-order diffracted beam is formed when images 276d, 276e, and 276f as the enlargingly projected images of the reproducing light beams are formed at appropriate positions on these photodetector elements without tracking and focusing errors.

The tracking photodetector elements 902a and 902b detect a positional change in images of the track guides 272 caused by a tracking error as a change in amounts of received light, and generate tracking error signals. The signal reproducing photodetector elements 901a to 901i and 903 detect the presence/absence of data pits of nine tracks from a change in amounts of light, and output reproduction signals.

In data recording, when the optical card 16 moves in the direction of an arrow a (forward direction), as shown in FIG. 8, the data pits 274 formed by the recording light beam spot 271 are moved toward the spot 276c formed by one first-order diffracted reproducing light beam. When the data pits 274 reach the position of the spot 276a, a change in amount of light is caused in the signal reproducing photodetector element 901e on the photodetector 90, and a reproduction signal is output. Therefore, a reproduction signal immediately after recording can be obtained, and verification is performed based on this reproduction signal to check if recording is performed with or without an error.

When the moving direction of the optical card 16 is reversed so that the optical card 16 moves in the direction of an arrow b (reverse direction), the data pits 274 formed by the recording light beam spot 271 are moved toward the spot 276b formed by the other first-order diffracted reproducing light beam. When the data pits 274 reach the position of the spot 276b, a change in amount of light is caused in the signal reproducing photodetector element 901e, and a reproduction signal immediately after recording can be obtained from this change in amount of light. Then, verification is performed based on this reproduction signal.

Hence, a reproduction signal can be obtained immediately after recording even when the optical card 16 is moved in the forward or reverse direction. In other words, a reproduction signal can be obtained immediately after recording regardless of the moving direction of the optical card 16 that is reciprocally moved with respect to the optical head 26, and verification can be performed to check if recording is performed with or without an error.

Figure 10:
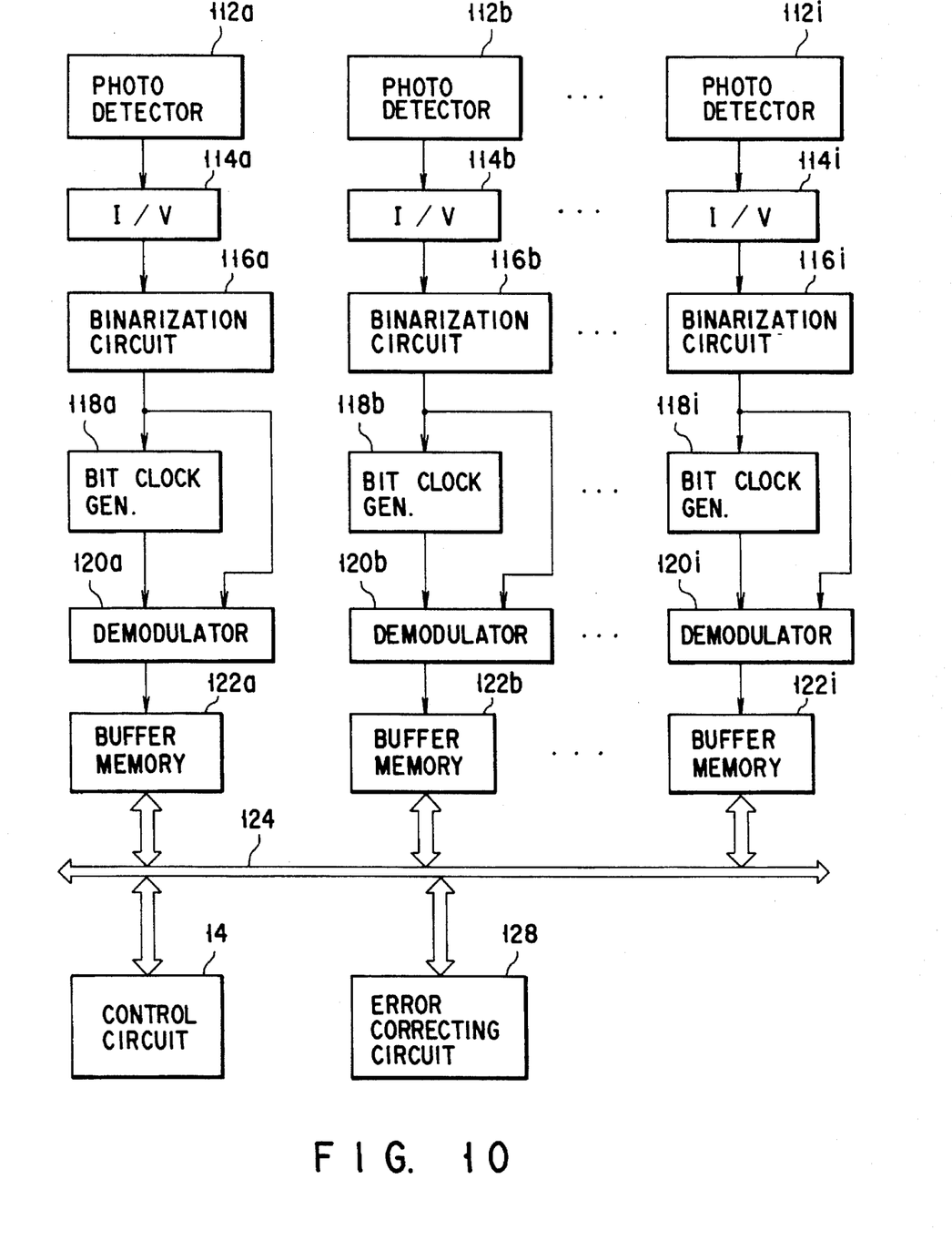
FIG. 10 is a block diagram of the data processor of the first embodiment.

The data processor 12 shown in FIG. 6 will be described. FIG. 10 shows the structure of the data processor 12 in detail. This embodiment exemplifies a case wherein nine tracks can be simultaneously read. However, the multi-track number is not limited to nine. Signal reproducing photodetector elements 112a–112i are provided on the photodetector 90. These photodetector elements correspond to the signal reproducing photodetector elements 901a–901i in FIG. 9.

I/V converters 114a–114i are provided to the data processor 12. Outputs from the signal reproducing photodetector elements 112a–112i are respectively supplied to the I/V converters 114a–114i. The I/V converters 114a–114i current/voltage-convert the signals received by the signal reproducing photodetector elements 112a–112i. Binarization circuits 116a–116i are connected to the output terminals of the I/V converters 114a–114i. The binarization circuits 116a–116i respectively convert the outputs from the I/V converters 114a–114i to binary signals using predetermined threshold levels, and output the binary signals to demodulators 120a–120i and bit clock generators 118a–118i.

The bit clock generators 118a–118i respectively generate bit clocks based on the binary signals output from the corresponding binarization circuits 116a–116i, and supply the bit clocks to the demodulators 120a–120i. The demodulators 120a–120i respectively sample the binary signals output from the binarization circuits 116a–116i upon reception of the bit clocks from the bit clock generators 118a–118i, and demodulate data based on the sampling results.

Buffer memories 122a–122i for storing demodulation results output from the corresponding demodulators 120a–120i are connected to the output terminals of the demodulators 120a–120i. The buffer memories 122a–122i store data before error correction in units of tracks.

The buffer memories 122a–122i are connected to a data bus 124, and the controller 14 and an error correcting circuit (ECC) 128 for performing error correction are connected to the data bus 124. The error correcting circuit 128 corrects errors of data stored in the buffer memories 122a–122i. Data after error correction may be stored again in the buffer memories 122a–122i, or be sent to the outside through the data bus 124. The controller 14 performs various types of required control operations for the error correcting circuit 128 and the buffer memories 122a–122i through the data bus 124, and usually comprises a CPU.

One track of an optical card has a capacity of about 2 KB including a redundant byte for an error correcting code. Hence, it is effective and optimum in terms of the cost, availability of the memory element, access speed, and the like to choose an SRAM (Static Random Access Memory) of about 4 K×8 bits as each of the buffer memories 122a–122i.

The operation of the optical card data recording/reproducing apparatus of this embodiment will be described.

To reproduce data, the optical card 16 is loaded on the conveyor table 22, and the optical head 26 and the optical card 16 are moved relative to each other. Then, the light beam from the optical head 26 is scanned along the tracks to write/read data.

Upon reception of an address of a target track to be accessed, the controller 14 calculates an amount of movement of the optical head 26 from the current position of the optical head 26 and the position of the target track to be read, and sends a command to the optical head driver 38, so that the motor 30 is driven to move the optical head 26 in a direction perpendicular to the tracks of the optical card 16. Then, the controller 14 sends a command to the motor servo circuit 34. The motor 24 is driven to move the conveyor table 22 between the pulleys 18a and 18b so as to move the optical card 16 in the direction of tracks with respect to the optical head 26, thereby scanning the target tracks with the light beam.

The operation so far is the same as that of a conventional optical card reproducing apparatus, and is called a seek operation. When the target track is irradiated with the light beam after the seek operation, recording/reproducing operation starts.

To record data, a write signal modulated on the basis of the write data is supplied from the controller 14 to the laser driver 28. Then, the recording semiconductor laser 50 of the optical head 26 is driven to emit a recording light beam, thereby forming a data pit 274 in a track of the optical card 16.

To reproduce data, the reproducing semiconductor laser 62 of the optical head 26 is driven to radiate a reproducing light beam on the optical card 16. Light reflected by the optical card 16 is received by the signal reproducing photodetector 90 of the optical head 26 to read recorded data from the intensity of the reflected light. The readout signal is demodulated by the demodulators 120a–120i in the data processor 12 in units of tracks and stored in the buffer memories 122a–122i in the data processor 12.

At this time, note that focus control and tracking control is performed by the focus/tracking servo circuit 40 and the focus/tracking actuator 96 (FIG. 7) provided to the optical head 26 so that the light beam traces the target track in the in-focus state.

Figure 11:
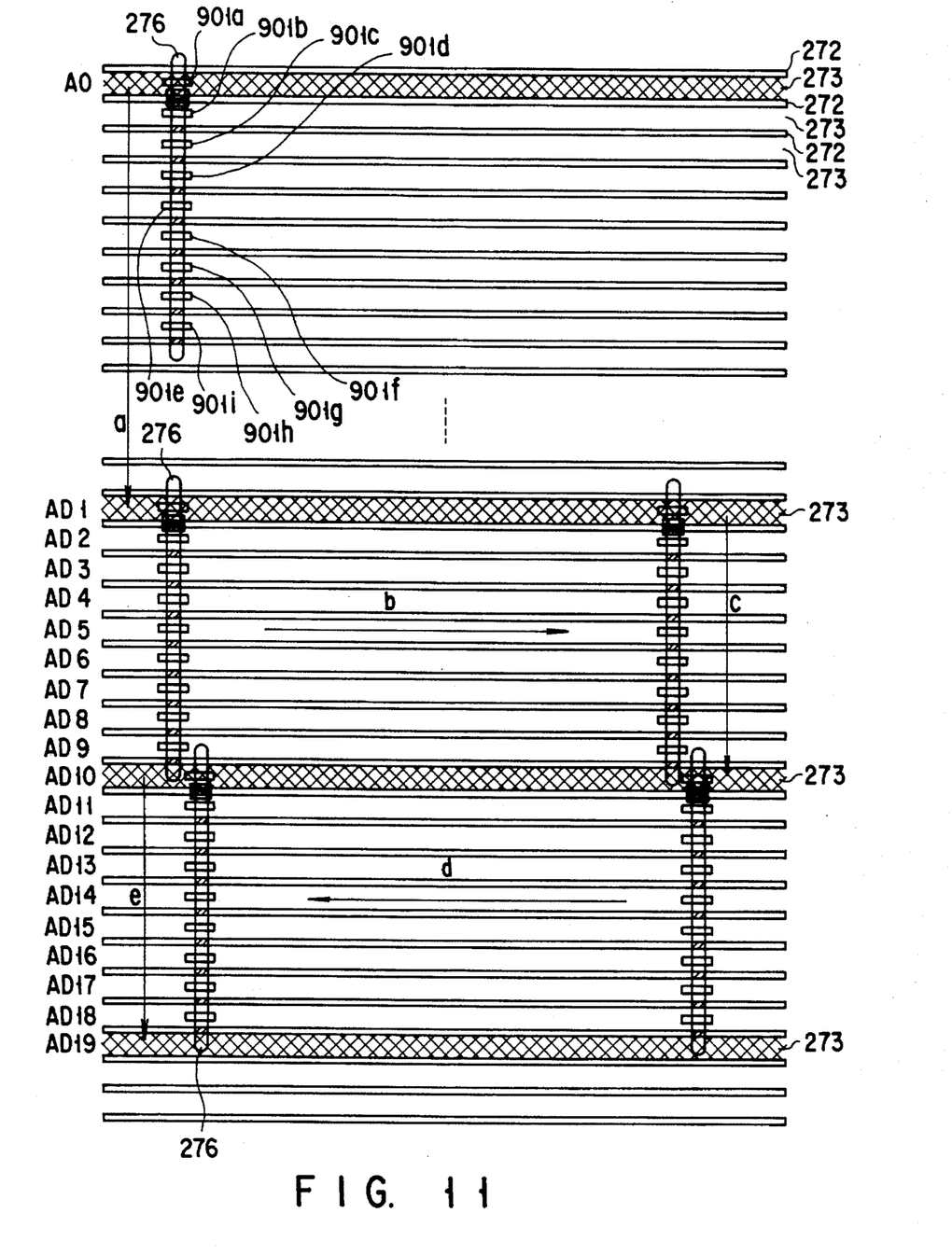
FIG. 11 is a view for explaining one example of track access in the first embodiment.
Figure 12:
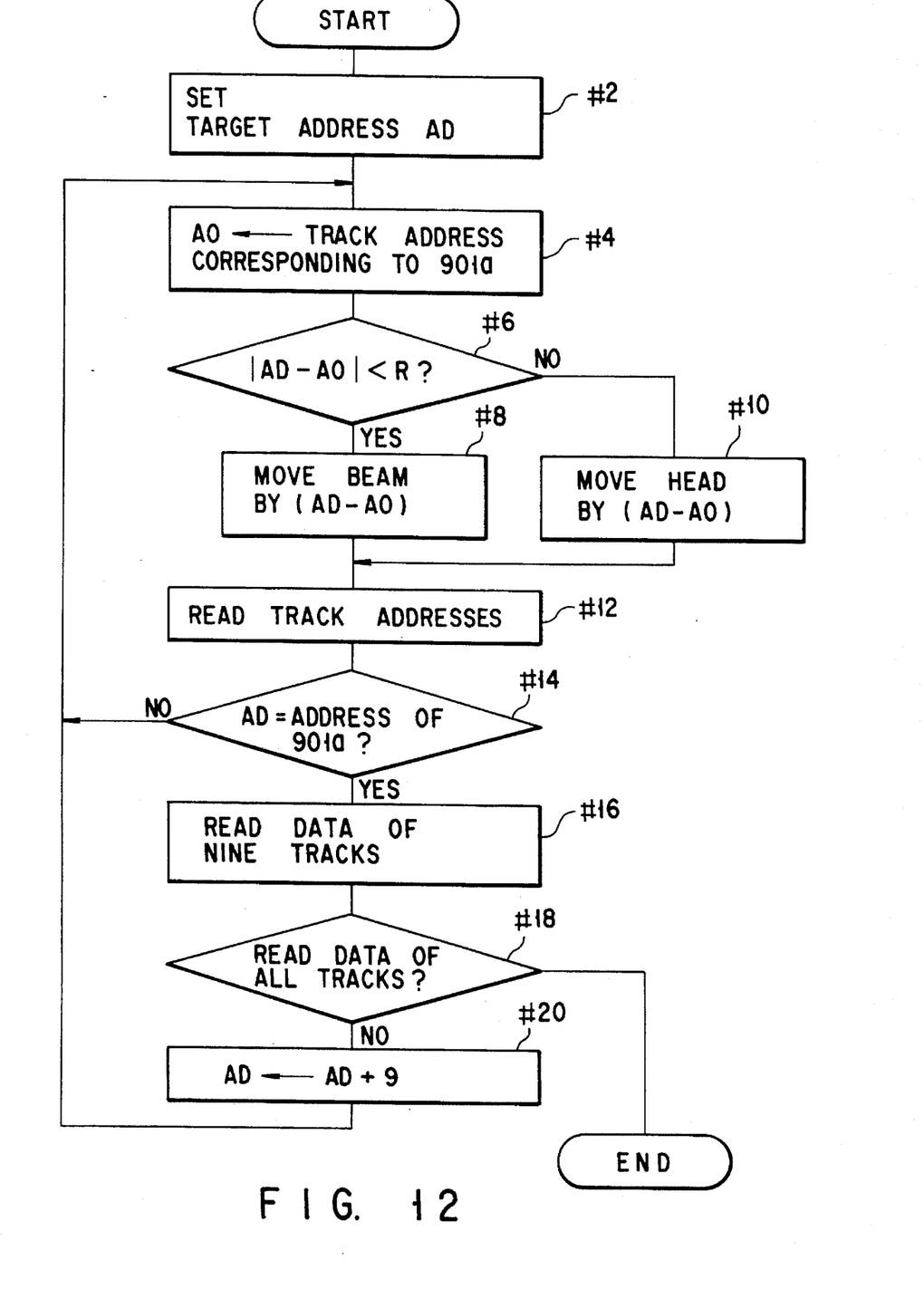
FIG. 12 is a flow chart showing the reproducing operation of the example shown in FIG. 11.

With reference to FIGS. 11 and 12, an example of track access according to this embodiment will be described. Though this embodiment can perform both recording and reproducing, the reproducing operation will be described as an example of the track access. The recording operation can be similarly performed according to this embodiment.

FIG. 11 is a view for explaining the positional relationship between the track and the reproducing light beam. In FIG. 11, as in FIGS. 8 and 9, reference numerals 272 denote track guides; 273, tracks formed between the track guides 272; 276, a reproducing light beam radiated on the plurality of (nine in this embodiment) tracks 273; and 901a to 901i, reproducing light-receiving elements for reproducing data of the nine tracks 273 on which the reproducing light beam 276 is radiated.

To reproduce data, the optical card 16 is loaded on the conveyor table 22, and the optical head 26 and the optical card 16 are moved relative to each other. Then, the light beam from the optical head 26 is scanned along the tracks to read data.

Upon reception of an address of a target track to be accessed, the controller 14 calculates an amount of movement of the optical head 26 from the current position of the optical head 26 and the position of the target track to be read, and sends a command to the optical head driver 38, so that the motor 30 is driven to move the optical head 26 in a direction perpendicular to the tracks of the optical card 16. Then, the controller 14 sends a command to the motor servo circuit 34. The motor 24 is driven to move the conveyor table 22 between the pulleys 18a and 18b so as to move the optical card 16 in the direction of tracks with respect to the optical head 26, thereby scanning the target tracks with the light beam.

In the above arrangement, since the nine reproducing light-receiving elements 901a to 901i are used, nine track addresses are present at a position on which the reproducing light beam 276 is radiated. Following points are important for the multi-track access.

(1) which one of the track addresses corresponding to the reproducing light beam 276 is the current position of the optical head 26?

(2) which one of the tracks irradiated by the reproducing light beam 276 is located at the target track?

Considering the above two points, the reproducing operation will be described with reference to the flow chart shown in FIG. 12.

When data reproduction of a given track address is designated by a host computer (not shown), the flow chart shown in FIG. 12 is executed.

A given track address (AD1 in the case of FIG. 11) is set as a target track address AD in step #2. A smallest address among the addresses of the nine tracks which are irradiated with the reproducing light beam 276 is set as a current track address A0 in step #4. In FIG. 11, the address is incremented in a vertical direction and the minimum address is assigned to the most upper track and the maximum address is assigned to the most lower track. Therefore, the track address corresponding to the most upper reproducing light-receiving element 901a is set as the current track address A0.

It is determined in step #6 whether |AD−A0| is a reference value R (e.g., 7) or less. This reference value is used to check whether coarse access for moving the head itself must be performed to move the beam or only fine access may be performed to move the beam. If YES in step #6, the objective lens is shifted by the objective lens moving means 96 to shift the light beam in the directions perpendicular to the tracks by a distance corresponding to |AD−A0| (fine access) in step #8. The moving direction of the light beam depends on the sign of (AD−A0). If NO in step #6, in step #10, the reproducing light beam 276 is moved by a distance corresponding to |AD−A0| in the direction perpendicular to the tracks by using coarse access for moving the optical head itself. The moving direction depends on the sign of (AD−A0).

It is to be noted that the light beam may be positioned at the center of the optical axis (a neutral position) by the objective lens driving means 96 when the coarse access is performed by moving the optical head itself.

The card is moved in a track direction to read out nine track addresses from the ID portion 6a of each of the nine tracks in step #12.

It is determined in step #14 whether the smallest address of the nine tracks corresponding to the reproducing light-receiving element 901a coincides with the target track address AD.

If NO in step #14, the flow returns to step #4, and the seek operation is continued by updating the current track address A0. If YES in step #14, data of the nine tracks AD1 to AD9 are simultaneously read from the data portion 2 of the optical card in step #16.

In step #18, it is determined whether the data of all tracks to be reproduced are read. If NO in step #18, the target track AD is increased by 9 (AD10=AD1+9, in the case of FIG. 11) and the flow returns to step #4. As described above, the data of nine tracks are simultaneously reproduced so that the access speed is increased and the reproducing efficiency is improved. The above multi-track access is also applicable to the recording operation.

Figure 13:
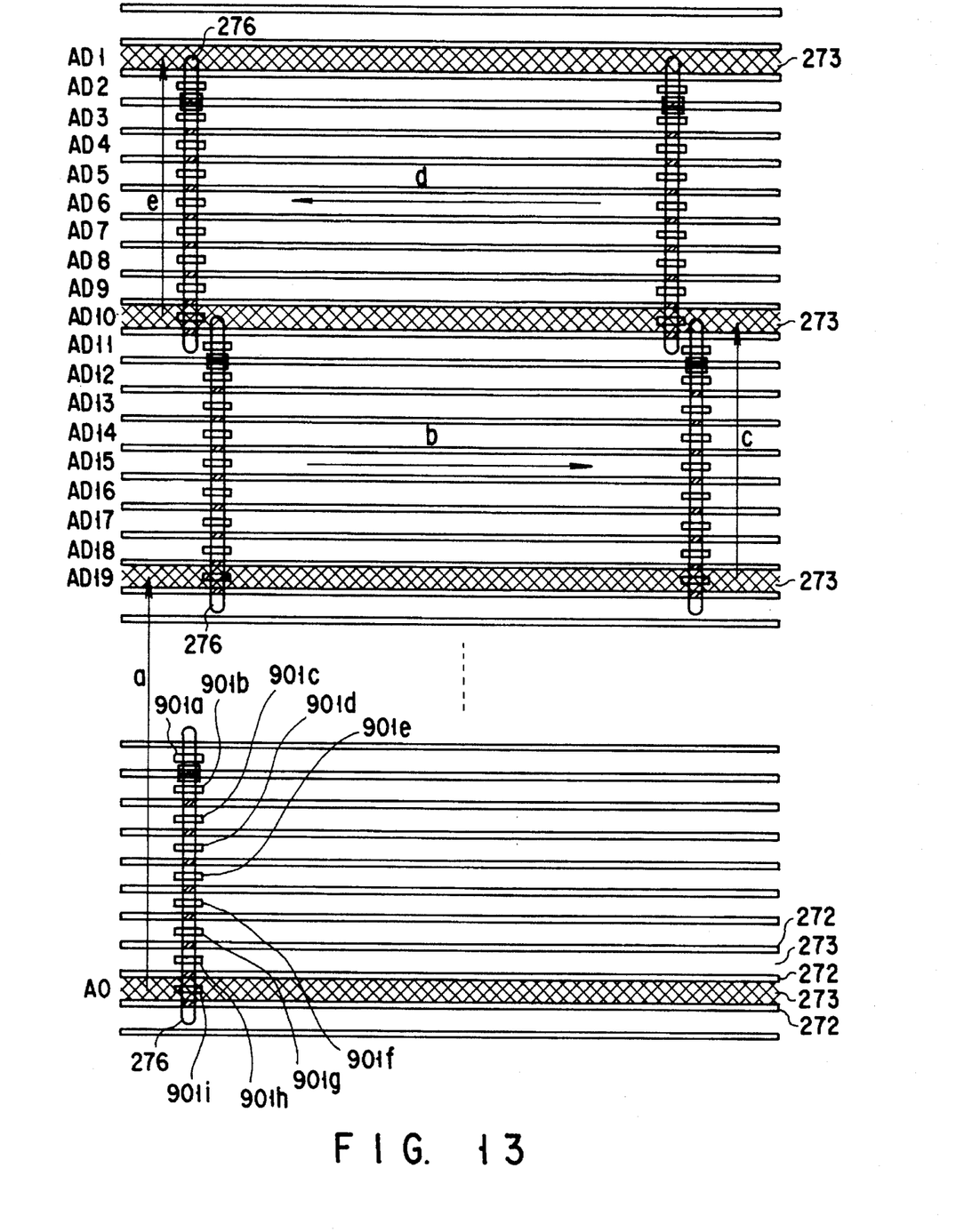
FIG. 13 is a view for explaining another example of track access in the fist embodiment.

FIG. 12 shows the case in which the address is increased during reproduction. FIG. 13 shows another case in which the address is decreased during reproduction.

Figure 14:
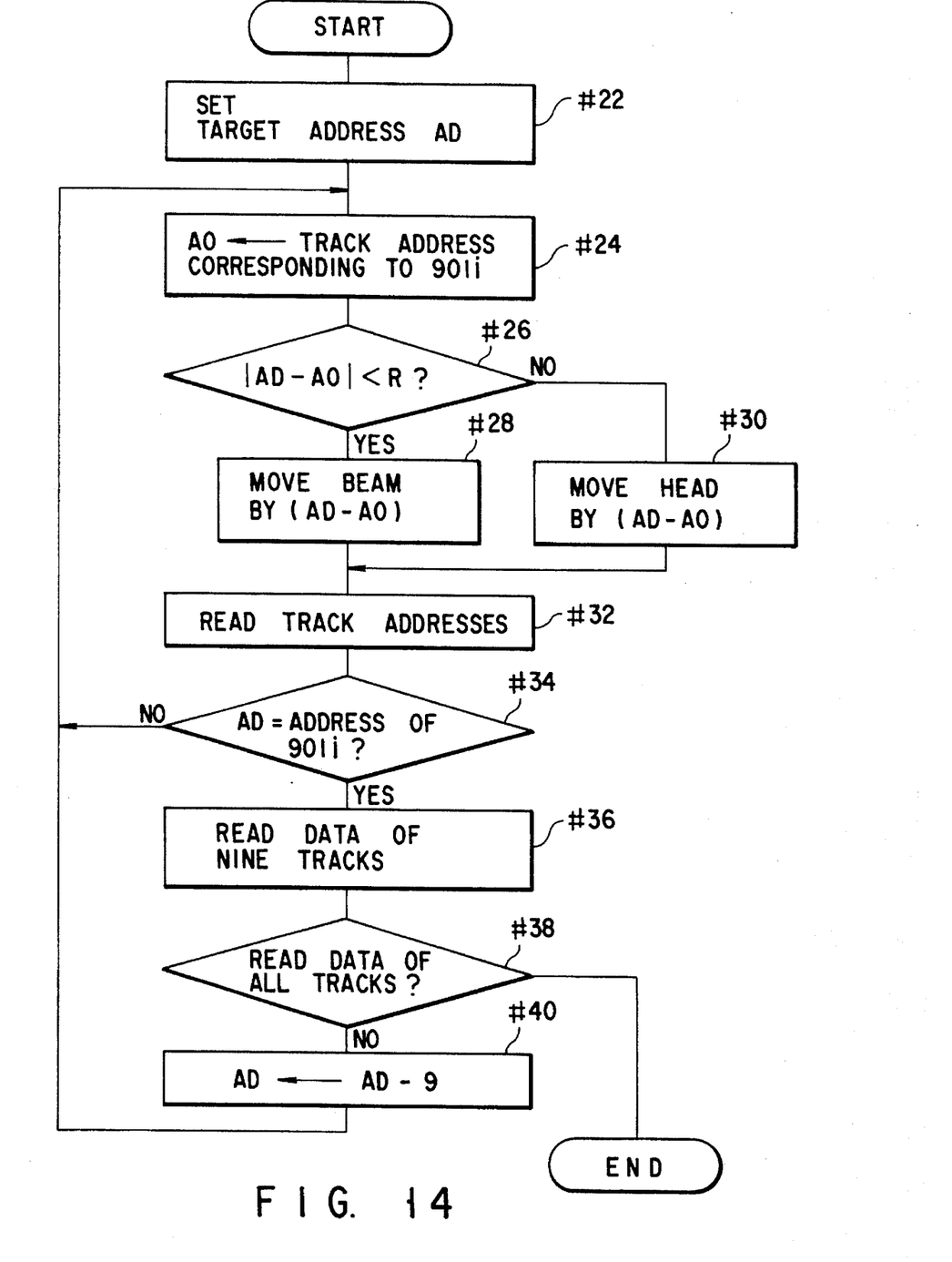
FIG. 14 is a flow chart showing the reproducing operation of the example shown in FIG. 13.

When data reproduction of a given track address is designated by a host computer (not shown), the flow chart shown in FIG. 14 is executed.

A given track address (AD19 in the case of FIG. 13) is set as a target track address AD in step #22. A largest address among the addresses of the nine tracks which are irradiated with the reproducing light beam 276 is set as a current track address A0 in step #24. In FIG. 13, the address is incremented in a vertical direction and the minimum address is assigned to the most upper track and the maximum address is assigned to the most lower track. Therefore, the track address corresponding to the most lower reproducing light-receiving element 901i is set as the current track address A0.

It is determined in step #26 whether |AD−A0| is a reference value R (e.g., 7) or less. This reference value is used to check whether coarse access for moving the head itself must be performed to move the beam or only fine access may be performed to move the beam. If YES in step #26, the objective lens is shifted by the objective lens moving means 96 to shift the light beam in the directions perpendicular to the tracks by a distance corresponding to |AD−A0| (fine access) in step #28. The moving direction of the light beam depends on the sign of (AD−A0). If NO in step #26, in step #30, the reproducing light beam 276 is moved by a distance corresponding to |AD−A0| in the direction perpendicular to the tracks by using coarse access for moving the optical head itself. The moving direction depends on the sign of (AD−A0).

It is to be noted that the light beam may be positioned at the center of the optical axis (a neutral position) by the objective lens driving means 96 when the coarse access is performed by moving the optical head itself.

The card is moved in a track direction to read out nine track addresses from the ID portion 6a of each of the nine tracks in step #32.

It is determined in step #34 whether the largest address of the nine tracks corresponding to the reproducing light-receiving element 901i coincides with the target track address AD.

If NO in step #34, the flow returns to step #24, and the seek operation is continued by updating the current track address A0. If YES in step #34, data of the nine tracks AD1 to AD9 are simultaneously read from the data portion 2 of the optical card in step #36.

In step #38, it is determined whether the data of all tracks to be reproduced are read. If NO in step #38, the target track AD is decreased by 9 (AD10=AD19–9, in the case of FIG. 13) and the flow returns to step #24. As described above, the data of nine tracks are simultaneously reproduced so that the access speed is increased and the reproducing efficiency is improved.

In the above description, it is assumed that a reproduction command from an external apparatus such as a host computer represents reproduction of continuous tracks. Alternatively, a track address may be sequentially increased to repeat a reproduction command for each track. Even when the reproduction command from the host computer is for one given track, the track address of the next reproduction command becomes the address of a track adjacent to the given track with a high probability. Therefore, the above multi-track access is useful for the latter reproduction command.

The flowcharts shown in FIGS. 12 and 14 do not show that a portion of the reproduction light beam is already located at the target track before the start of seek operation. However, the above flowcharts can be applied to the case in which a portion of the reproduction light beam is already located at the target track before the start of a seek operation.

Further, if the current position of the reproduction light beam is opposite to that shown in FIGS. 11 and 13 with regard to the target track, i.e., if the current address A0 is larger than the target address AD1 in FIG. 11 and if the current address A0 is smaller than the target address AD19 in FIG. 13, the above flowcharts can be applied.

As described above, according to the present invention, a multi-track reading is realized by moving the reproduction light beam by the number of the multi-track for every multi-track reproduction. Therefore, the track access efficiency is improved.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although nine reproducing light-receiving elements are used in each of the above embodiments, the number of reproducing light-receiving elements is not limited to nine. A recording medium is not limited to an optical card. An optical disk, a magneto-optical card, or a magneto-optical disk may be used as the recording medium.

What is claimed is:

1. An apparatus for recording/reproducing data using an optical data recording medium having a large number of data recording tracks, each of the tracks having a track address for identifying the tracks, the apparatus comprising:

means for generating a recording/reproducing light beam which simultaneously irradiates a group of plural tracks from said large number of data recording tracks, said group of plural tracks which are simultaneously irradiated including two end tracks;

means for detecting a track address of one of the two end tracks of the group of plural tracks which are simultaneously irradiated with the recording/reproducing light beam;

first moving means for moving the light beam in a direction perpendicular to the tracks by a distance corresponding to a distance difference between the detected track address and an address of a first track to be accessed first upon an access request of the first track, so that the recording/reproducing light beam irradiates the group of plural tracks following the first track;

means for recording/reproducing data to/from the group of plural tracks simultaneously by scanning the light beam along the plurality of tracks which are simultaneously irradiated with the recording/reproducing light beam; and second moving means for moving the light beam in a direction perpendicular to the tracks by a distance spanned by the group of plural tracks after said recording/reproducing means records/reproduces data to/from the group of plural tracks, so that the recording/reproducing light beam irradiates a next group of plural tracks to be accessed.

2. An apparatus according to claim 1, wherein:

said data recording medium is an optical card having said large number of tracks arranged thereon so as to be parallel to each other, said tracks being elongated and extending in a longitudinal direction; and said recording/reproducing means comprises means for relatively moving said light beam generating means and said optical card along the longitudinal direction of said tracks in a reciprocating manner.

3. An apparatus according to claim 1, wherein:

said first moving means comprises means for moving said light beam generating means when a distance that the light beam is to be shifted is larger than a predetermined value, and means for moving the light beam by shifting an irradiation position of the light beam without moving said light beam generating means when the distance that the light beam is to be moved is not larger than the predetermined value.

4. An apparatus according to claim 1, wherein;

said second moving means comprises means for moving said light beam generating means when the distance spanned by the group of plural tracks is larger than a predetermined value, and means for moving the light beam by shifting an irradiation position of the light beam without moving said light beam generating means when the distance spanned by the group of plural tracks is not larger than the predetermined value.

5. An apparatus according to claim 1, wherein:

said data recording medium is an optical card having said large number of tracks arranged thereon so as to be parallel to each other, the tracks being elongated and respectively having sequentially increasing addresses which increase from a minimum address to a maximum address; and said detecting means comprises means for detecting a minimum address of a plurality of tracks which are simultaneously irradiated by the recording/reproducing light beam when the addresses of the tracks to be accessed for recording/reproduction are increased, and means for detecting a maximum address of a plurality of tracks which are simultaneously irradiated by the light beam when the addresses of the tracks to be accessed for recording/reproduction are decreased.

6. An apparatus according to claim 1, wherein:

said data recording medium is an optical card having said large number of tracks arranged thereon so as to be parallel to each other, said tracks being elongated and extending in a longitudinal direction.

7. An apparatus according to claim 1, wherein said data recording medium is an optical card having said large number of tracks arranged thereon so as to be parallel to each other, said tracks being elongated and extending in a longitudinal direction; and said recording/reproducing means comprises means for relatively moving said light beam generating means and said optical card along the track in a reciprocating manner.

8. An apparatus for recording/reproducing data using an optical data recording medium having a large number of data recording tracks, each of the tracks having a track address for identifying the tracks, the apparatus comprising:

means for generating a recording/reproducing light beam which simultaneously irradiates a current group of plural tracks of said large number of data recording tracks;

means for recording/reproducing data to/from the current group of plural tracks simultaneously by scanning the light beam along the plurality of tracks which are simultaneously irradiated with the recording/reproducing light beam; and means for directly moving the light beam to a next group of tracks in a direction perpendicular to the tracks by a distance spanned by the current group of plural tracks after said recording/reproducing means records/reproduces data to/from the group of plural tracks, so that the recording/reproducing light beam irradiates the next group of plural tracks to be accessed.

* * * * *